United States Patent [19]

Steckler et al.

[11] 3,899,635

[45] Aug. 12, 1975

[54] DUAL MODE DEFLECTION SYNCHRONIZING SYSTEM

[75] Inventors: Steven Alan Steckler, Clark; Allen Leroy Limberg, Lambertville, both of N.J.

[73] Assignee: RCA Corporation, New York, N.Y.

[22] Filed: Jan. 30, 1974

[21] Appl. No.: 438,047

[52] U.S. Cl. .......... 178/69.5 TV

[51] Int. Cl.² .......... H04N 5/04

[58] Field of Search .......... 178/7.35, 7.5 S, 69.5 TV; 328/139

[56] References Cited

UNITED STATES PATENTS

| | | | |
|---|---|---|---|
| 3,588,351 | 6/1971 | Baun | 178/69.5 TV |
| 3,671,669 | 6/1972 | Abbott | 178/7.3 S |
| 3,691,297 | 9/1972 | Merrell et al. | 178/69.5 TV |
| 3,715,499 | 2/1973 | Steckler | 178/69.5 TV |
| 3,751,588 | 8/1973 | Eckenbrecht et al. | 178/7.3 S |
| 3,814,855 | 6/1974 | Kokado | 178/69.5 TV |

*Primary Examiner*—Richard Murray
*Assistant Examiner*—Aristotelis M. Psitos
*Attorney, Agent, or Firm*—Eugene M. Whitacre; Paul J. Rasmussen

[57] ABSTRACT

A dual mode deflection synchronizing system includes a resettable counter which generates noise-free internal synchronizing signals and signals representative of the interval during which external vertical synchronizing signals should be received provided the counter is properly synchronized. A sync signal verification detector is coupled to the source of external vertical sync signals and to a mode switch so that if the external signals arrive during this prediction interval as determined by the sync signal verification detector the system continues to operate in a synchronized mode on its internally generated synchronizing signals. If the external signals do not arrive during this prediction interval, the mode switch switches the system into a non-synchronized mode. A vertical sync signal detector which is also coupled to the source of external sync signals and to the mode switch begins to search for an external signal which has the time duration characteristic of an authentic external synchronizing signal. Until such a signal is received, the system continues to be synchronized by internal synchronizing signals generated by the resettable counter. When such a signal is received, the vertical sync signal detector resets the counter to correct its synchronization with the received external vertical synchronizing signal and toggles the mode switch to return the system to its synchronized mode of operation.

6 Claims, 3 Drawing Figures

DUAL MODE DEFLECTION SYNCHRONIZING SYSTEM

BACKGROUND OF THE INVENTION

This invention relates to deflection synchronization systems.

A common problem associated with the reception of television signals is that a television signal is subject to degradation from various noise sources. Sources of noise which cause malfunction of the television receiver vertical deflection synchronization system are one of many distracting forms of interference which the viewer may experience. The phenomena commonly referred to as "jitter" or "roll" of the kinescope display are frequently caused by noise triggering of the vertical deflection synchronization system.

One type of noise of particular concern in eliminating jitter or roll is impulse noise, that is, noise which is characterized by one or more short-duration pulses. The pulses may be of the same polarity as the vertical deflection sync signal. Such pulses are frequently referred to as "black-going" impulse noise. If the pulses are of opposite polarity to the vertical deflection sync signal, they are referred to as "white-going" impulse noise.

Impulse noise often occurs in what are known as noise "doublets". These noise "doublets" consist of a black-going impulse noise spike followed by a white-going impulse noise spike or a white-going impulse noise spike followed by a black-going impulse noise spike. The impulse noise may have several sources of origin but one of the most common ones is electric motor noise. Electric motor noise may be introduced into the receiver from such ordinary household equipment as an electric shaver or an electric mixer.

Regardless of its source, however, this impulse noise may interfere with operation of the vertical deflection system. Black-going impulse noise may pass into the vertical deflection synchronization system and cause spurious triggering of the vertical deflection circuitry. White-going impulse noise occurring in the vertical sync signal may completely eradicate the vertical sync signal and cause the system to become unsynchronized. The transmitted vertical sync signal which controls the operation of the vertical deflection system in the absence of noise occurs once during each vertical field or vertical deflection cycle. In the television system employed in the United States, vertical fields are generated at a rate of approximately 60 Hertz. Many television receivers presently being manufactured employ conventional low pass filter circuitry in the sync signal processing circuitry in an attempt to isolate the vertical deflection sync circuitry from impulse noise in order to prevent interference with the vertical deflection sync by impulse noise.

However, since impulse noise can be generated at the line voltage frequency or some multiple thereof by alternating current motors within the home as previously explained, conventional filters may allow some frequency components of the impulse noise to pass into the vertical sync circuitry in the same manner as the authentic vertical sync signal.

Some more sophisticated methods for dealing with the problem of impulse noise include making a measurement of the width of any signal which passes into the vertical sync circuitry to determine if the signal approximates the width characteristic of the vertical sync before allowing the signal to trigger the vertical sync. Other methods incorporate a memory circuit for retaining information of when the last vertical sync signal appeared to predict when the next succeeding vertical sync signal should appear to disable the vertical sync circuitry between these prediction intervals and thereby prevent spurious triggering of the vertical deflection circuitry. Some systems have been proposed which generate their own internal vertical sync in the absence of any external sync which fulfills one of the above conditions i.e. a received signal which has the width characteristic of vertical sync or which occurs during an interval when vertical sync is predicted to occur.

Ideally, however, a vertical deflection sync system could achieve even greater immunity from spurious triggering if it performed all of these functions, and unlike any of the systems described above, operated entirely independently of the received vertical sync signal except when the system detected that the vertical sync signal was not present.

Such a system would operate on its own uniform, noise-free internally generated vertical sync signal if the received signal had substantially the proper time duration in a predicted time interval to be considered valid vertical sync information. If no external signal fulfilling the proper time duration and predicted time interval criteria were found, the system would search for a signal which met the proper time duration criterion and the system's internally generated sync and prediction interval signals would then be synchronized by that signal.

SUMMARY OF THE INVENTION

In accordance with the present invention a synchronizing system comprises a source of external synchronizing signals and resettable counting means adapted for counting signals from a source of second signals integrally related in frequency to said external signals for generating internal signals in synchronism with the external synchronizing signals, the resettable counting means being resettable by the internally generated signals and by signals generated by the synchronizing system when the internal signals are not substantially in synchronism with the external synchronizing signals. External synchronizing signal verification means coupled to the source of external synchronizing signals and to the resettable counting means verify the presence or absence of external synchronizing signals during the internal signals and generate first and second signal levels in response to verification of the presence and absence respectively of the external synchronizing signals. External synchronizing signal detecting means coupled to the source of external synchronizing signals detect when signals from the source of external synchronizing signals have at least a predetermined time duration and generate signals in response to detection of signals having at least this predetermined time duration. Mode switching means are coupled to the resettable counting means, to the external synchronizing signal detecting means and to the external synchronizing signal verification means for switching to a synchronous mode of operation or to a non-synchronous mode in respone to the first or second signal levels respectively generated by the external synchronizing signal verification means. Switching to a non-synchronoús mode conditions the mode switching means to pass a signal from the external synchronizing signal detecting means upon the occurrence of a subsequent signal from the source of external synchronizing signals for resetting the resettable counting means and shifting the synchronization of the internal signals such that succeeding internal signals are substantially in synchronism with subsequent signals from the source of external synchronizing signals.

The invention will best be understood by reference to the following description and accompanying drawings of which:

DESCRIPTION OF THE PREFERRED EMBODIMENT

Figure 1:
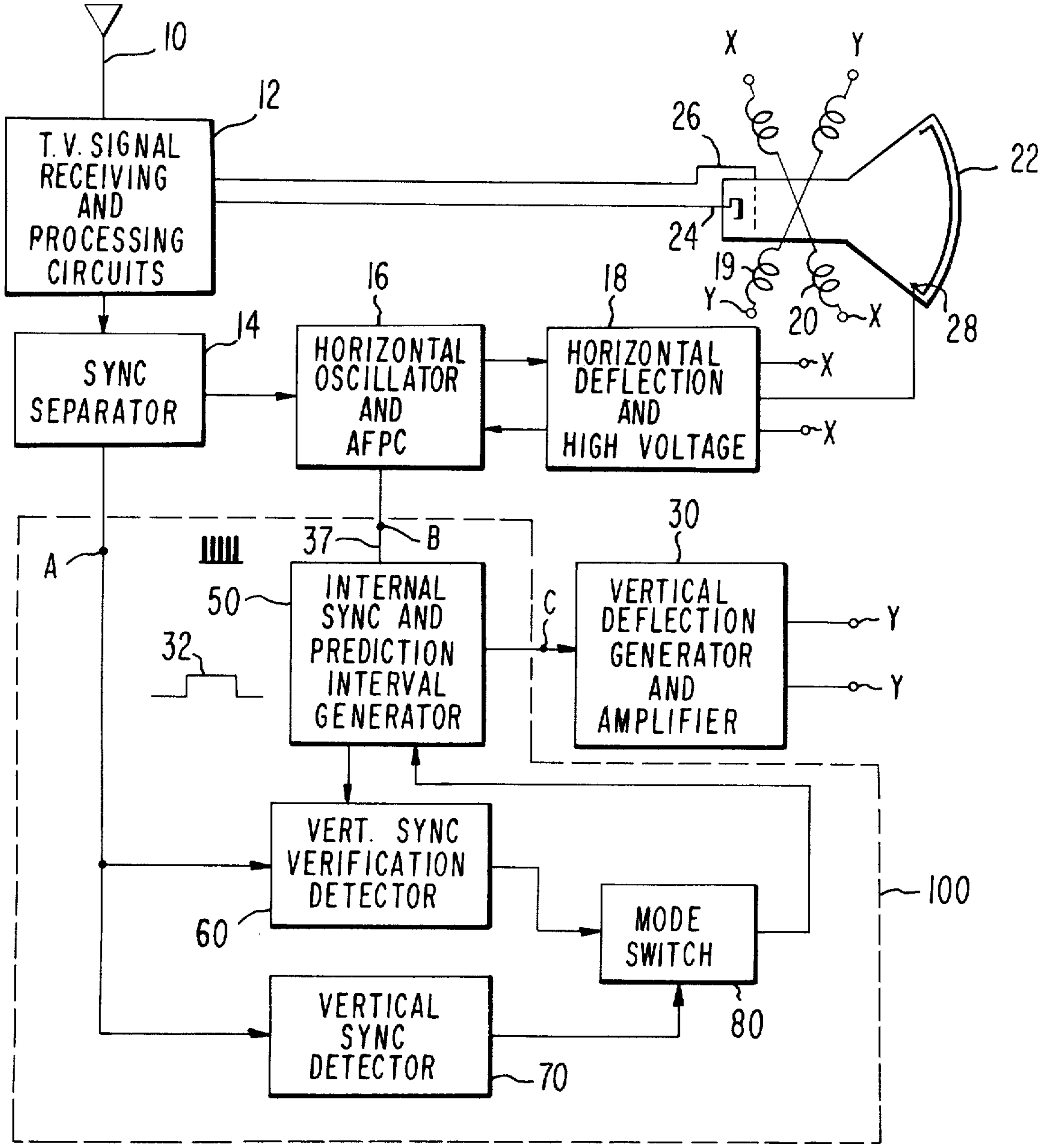
FIG. 1 is a block diagram of a television receiver incorporating a preferred embodiment of the present invention.

In the television receiver illustrated in FIG. 1, composite television signals received on an antenna 10 are processed in a complement of conventional television signal receiving and processing circuits 12 including a tuner and R.F. amplifier, a video detector, an I.F. amplifier, an audio detector, audio amplifier and speaker, a video amplifier and, in a color television receiver, a chrominance circuit and chrominance control circuitry.

Output terminals of television signal receiver and processing circuits 12 are coupled to one or more grids represented by a grid 26 and one or more cathodes represented by a cathode 24 of a kinescope 22. Another output terminal of television receiving and processing circuits 12 is coupled to a sync separator 14 which separates the composite vertical and horizontal sync information from the composite video signal.

Sync separator 14 is coupled to an input terminal of a horizontal oscillator and automatic frequency and phase control (AFPC) circuit 16. Horizontal sync signals coupled from sync separator 14 to horizontal oscillator and AFPC circuit 16 cause circuit 16 to oscillate in synchronism with the received horizontal sync signals. These oscillations in turn synchronize the operation of a horizontal deflection and high voltage stage 18 to which horizontal oscillator and AFPC circuit 16 is coupled.

Synchronized horizontal deflection sawtooth current waveforms generated thereby in horizontal deflection and high voltage stage 18 are coupled through terminals X—X to horizontal deflection windings 20 to deflect the electron beam generated at cathode 24 of kinescope 22 across the faceplate of the kinescope in the horizontal direction. A high voltage generating circuit in horizontal deflection and high voltage circuit 18 supplies high voltage to a high voltage terminal 28 of kinescope 22.

Sawtooth voltage representative of the horizontal deflection sawtooth current waveforms generated in circuit 18 is coupled to horizontal oscillator and AFPC circuit 16 to insure that the frequency and phase of the sawtooth current signals generated in circuit 18 are the same as the frequency and phase of those signals generated by the received horizontal sync signals in horizontal oscillator and AFPC circuit 16.

Sync separator 14 is also coupled through a terminal A to a dual mode vertical synchronizing system 100. Horizontal oscillator and AFPC circuit 16 is coupled through terminal B to dual mode vertical synchronizing system 100. An output terminal C of dual mode vertical sync system 100 is coupled to a vertical deflection generator and amplifier 30. Output terminals Y—Y of vertical deflection circuit 30 are coupled to a pair of vertical deflection windings 19 of kinescope 22.

Dual mode vertical sync system 100 includes a vertical sync verification detector 60 and a vertical sync detector 70, both of which have input terminals coupled to sync separator 14 through terminal A. An internal sync and prediction interval generator 50 of dual mode vertical sync system 100 has an input terminal coupled through point B to an output terminal of horizontal oscillator and AFPC circuit 16.

An output terminal of internal sync and prediction interval generator 50 is coupled to an input terminal of vertical sync verification detector 60. Another output terminal of internal sync and prediction interval generator 50 is coupled through terminal C to vertical deflection generator and amplifier circuit 30. Output terminals of vertical sync verification detector 60 and vertical sync detector 70 are coupled to two input terminals of a mode switch 80. An output terminal of mode switch 80 is coupled to another input terminal of internal sync and prediction interval generator 50. Vertical sync signals 32 are coupled from sync separator 14 to vertical sync verification detector 60 and vertical sync detector 70.

Figure 2:
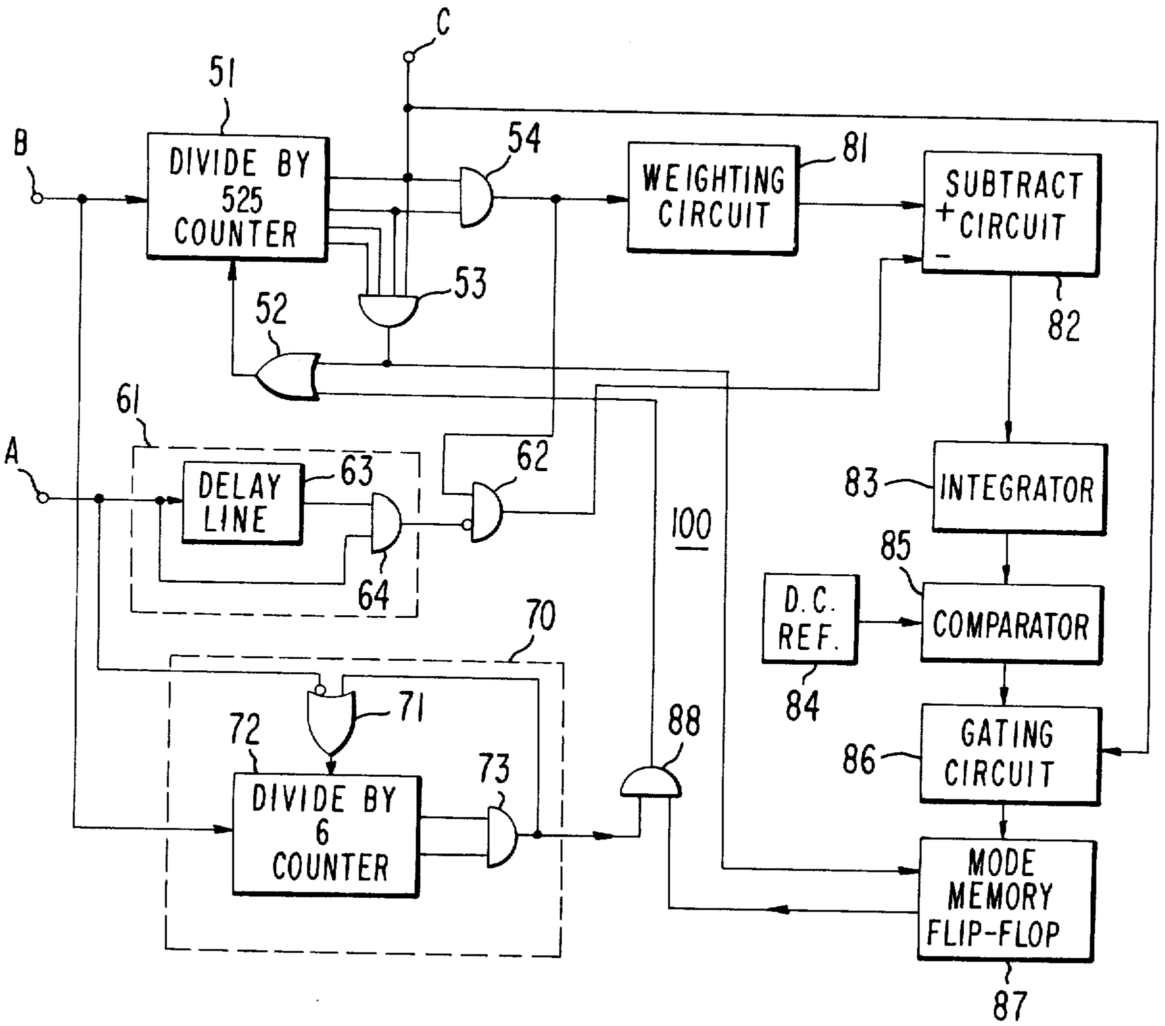
FIG. 2 is a more detailed block diagram of the preferred embodiment illustrated in FIG. 1.

Clock pulses 37 which, in this embodiment of the invention, occur at the equalizing pulse frequency which is twice the horizontal sync pulse frequency (which is about 15.734 Kilohertz in the television system which is the standard in the United States) are generated in horizontal oscillator and AFPC circuit 16 and are coupled to internal sync and prediction interval generator 50. These clock frequency pulses may also be supplied to vertical sync detector 70 to synchronize its operation if desired. Such an arrangement is illustrated in FIG. 2 and will be described subsequently.

When little or no noise is present in the vertical sync signal 32, it is identifiable by vertical sync verification detector 60 and vertical sync detector 70. When the receiver of FIG. 1 is initially turned on, vertical sync verification detector 60 conditions mode switch 80 to place the system in its search mode and vertical sync detector 70 begins to search for a signal with sufficient time width to be considered valid vertical sync. Once such a signal is found, vertical sync detector 70 passes a signal through mode switch 80 to internal sync and prediction interval generator 50 to synchronize its internally generated sync with the detected external sync.

From the time at which vertical sync is detected at terminal A and circuit 50 is synchronized to the detected sync, as long as vertical sync verification detector 60 continues to verify the presence at terminal A of a signal with at least a predetermined time duration and amplitude in a predicted time interval, mode switch 80 passes no signals to internal sync and prediction interval generator 50. This constitutes the in-sync mode of system 100 and means that vertical sync is continuously being found in the time interval in which generator 50 predicts it should be found. Therefore, there is no need to update the internally generated sync and prediction interval which circuit 50 is producing.

However, when the channel in which the receiver of FIG. 1 is tuned is changed, it is likely that vertical sync will not appear in this predicted interval. Similarly, if negative-going noise, including impulse noise from the sources mentioned above, eradicates vertical sync signal 32 or decreases its amplitude below a minimum level, vertical sync verification detector 60 senses the absence of sync in the predicted interval. A resulting signal level on an output terminal of vertical sync verification detector 60 conditions mode switch 80 for the passage of a signal from vertical sync detector 70 to internal sync generator 50 to resynchronize it when the vertical sync detector 70 detects a signal at terminal A which has a width characteristic greater than or equal to that of the transmitted vertical sync.

During the interval when vertical sync is absent from terminal A, the receiver's vertical deflection continues to be synchronized by signals from internal sync and prediction interval generator 50. Thus, if the vertical sync signal has been eradicated or its amplitude has been decreased below some predetermined level by negative-going noise in the vertical sync or for some other reason, the kinescope display will continue to be correctly synchronized by the action of circuit 50.

If the absence of sufficient sync from the prediction interval has been brought about by changing channels, a signal subsequently received on the new channel frequency which exhibits the width characteristic of a vertical sync signal will trigger an output signal from vertical sync detector 70. This output signal will pass through mode switch 80 by virtue of the enabling signal level generated in vertical sync verification detector 60 when the absence of vertical sync was first detected.

Dual mode sync system 100 thus generates its own noise-free internal vertical sync signals which it synchronizes with received vertical sync by verifying the presence of a signal having a sufficient time duration-amplitude product within the interval when internal vertical sync is being generated. If such a signal is present, the system's internal vertical sync is not resynchronized with the received signal. If such a signal is absent, the system conditions itself to search for the next signal which has the width characteristic of vertical sync while maintaining its original internal vertical sync. This is done to allow for correct vertical synchronization even when external vertical sync has been obliterated by negative- or white-going noise.

When the next incoming signal with the width characteristic of vertical sync is detected, a sync shifting or updating signal is generated and passed to the internal sync generator to update its operation. By updating the internal sync, the prediction interval is also updated and the system then predicts sync in the new prediction interval.

If a signal having a sufficient time duration-amplitude product to be considered transmitted vertical sync is found in the new prediction interval, the system continues to function in its in-sync mode as summarized in the immediately preceeding paragraphs. If such a signal is not found there, then the system returns to its out-of-sync or search mode of operation as described above.

FIG. 2 illustrates a block diagram of a preferred embodiment of dual mode sync system 100 as illustrated in FIG. 1. Clock signals at approximately 31.5 Kilohertz, twice the horizontal sync frequency, are coupled to terminal B. Terminal B is coupled to an input terminal of a divide-by-525 counter 51. The five hundred twenty-fifth count output signals are decoded in an AND gate 53 and coupled through one terminal of an OR gate 52 to the reset input terminal of divide-by-525 counter 51. A second AND gate 54 decodes signals representative of another count from divide-by-525 counter 51. This decoded output signal is of such duration and occurs at a time in relation to the internally generated sync to assure that when the internally generated sync is in proper sync with the received vertical sync signal, some substantial portion of that received vertical sync signal will fall within the duration of the decoded output signal from AND gate 54.

For example, in the system shown, counter 51 is a conventional divide-by-525 counter composed of ten serially coupled triggered flip-flops. The decoding input signals to AND gate 53 are the output signals of the first, third, fourth and tenth flip-flops. The decoding input signals from prediction interval AND gate 54 are the output signals of the fourth and tenth flip-flops which give a prediction pulse 2.5 horizontal sync pulse periods wide during the last five counts before reset of each 525 pulse series counted by divide-by-525 counter 51. An output signal from dual mode vertical sync system 100 at terminal C is the output signal of the tenth flip-flop, a pulse 6.5 horizontal sync pulse periods wide between the five hundred twelfth count of each 525 pulse series and the reset count, 525, of divide-by-525 counter 51.

It can be seen from this discussion that blocks 51, 52, 53, and 54 function as the internal sync and prediction interval generator 50 of FIG. 1.

Terminal B is also coupled to an input terminal of a divide-by-six counter 72 for providing signals at twice the horizontal sync frequency thereto for counting. Output signals are coupled from counter 72 to an AND gate 73 to decode the sixth count of counter 72. An output terminal of AND gate 73 is coupled to an input terminal of an OR gate 71, the output terminal of which is coupled to the reset input terminal of divide-by-six counter 72. Divide-by-six counter 72 may be constructed from three serially coupled flip-flops, output terminals of the second and third flip-flops being coupled to input terminals of AND gate 73. In this manner, the sixth count of counter 72 will produce a reset signal on an output terminal of AND gate 73 which will reset counter 72 through OR gate 71.

Vertical sync at terminal A is coupled to an inverting input terminal of OR gate 71. It may be seen that when no signal is present at terminal A, the inverted input signal at an input terminal of OR gate 71 will continually reset divide-by-six counter 72. Thus, it can be seen that only in the presence of a signal at least six counts (3 horizontal sync signal periods) in length at terminal A will there be any decoded output signal at the output terminal of AND gate 73 to reset counter 72 through OR gate 71.

Thus, block 70 comprising elements 71, 72 and 73 serves to determine whether a received signal at terminal A has at least the time duration of the vertical sync signal. Since a noise signal with the time duration of vertical sync is unlikely, block 70 functions as a vertical sync detector.

Terminal A is also coupled to an input terminal of a delay line 63 and an input terminal of an AND gate 64. An output terminal of delay line 63 is coupled to a second input terminal of AND gate 64. Block 61 comprising elements 63 and 64 is called a "short pulse eliminator" or "grass eliminator". It eliminates pulses or portions thereof appearing at terminal A which are less than or equal in time duration to the delay time of delay line 63. It is useful in eliminating much of the impulse noise which may be generated in the vertical sync signal.

For example, if the delay line time is four microseconds, the output signal from AND gate 64 will be the vertical sync at terminal A less all pulses of four microseconds or shorter duration which will eliminate black-going impulse noise of four microseconds or shorter duration and remove four microseconds from the leading edge of any longer duration pulses and vertical sync signal 32. The missing leading edge of vertical sync signal 32 will not substantially affect the operation of the system, however, because the system's sensitivity may be adjusted to compensate for the lost energy.

Prediction interval signals are coupled from an output terminal of AND gate 54 to an input terminal of a weighting circuit 81 and to an input terminal of an AND gate 62. An output terminal of AND gate 64 is coupled through an inverting input terminal to AND gates 62. It may be seen that AND gate 62 generates an output signal during the prediction interval signal at the output terminal of AND gate 54 only when no signal is present on the output terminal of AND gate 64. Therefore, "grass eliminator" 61 and AND gate 62 function as an arrangement for detecting when vertical sync is absent from terminal A during the prediction interval.

An output terminal of weighting circuit 81 is coupled to a "+" input terminal of a subtraction circuit 82. An output terminal of AND gate 62 is coupled to the "—" input terminal of subtraction circuit 82. An output terminal of subtraction circuit 82 is coupled to an input terminal of an integrating circuit 83, the output terminal of which is coupled to one input terminal of a comparator 85. Another input terminal of comparator 85 is coupled to a direct current reference voltage source 84.

An output terminal of comparator 85 is coupled to an input terminal of a gating circuit 86. A keying input terminal of gating circuit 86 is coupled to terminal C for keying information out of comparator 85 through gating circuit 86 only when signal is present at terminal C. This keyed output information is coupled to an input terminal of an AND gate 88. Mode memory flip-flop 87 is also coupled to AND gate 53 and is set periodically by output signals therefrom at the close of the prediction interval.

An output terminal of AND gate 73 in vertical sync detector 70 is coupled to another input terminal of AND gate 88. Output signals from AND gate 88 are coupled to OR gate 52 in the reset circuit of divide-by-525 counter 51.

Weighting circuit 81 modifies the amplitude of the prediction interval signal to adjust the threshold level against which a vertical sync absence signal on the output terminal of AND gate 62 is compared. Weighting circuit 81 thereby controls the time duration-amplitude product during the prediction interval against which any signal appearing at terminal A must favorably compare to be considered valid vertical sync.

When a prediction interval signal is present on input terminals of weighting circuit 81 and AND gate 62 and no vertical sync is present at terminal A, the output terminal of AND gate 62 has a positive value which is higher than the threshold value produced by weighting circuit 81 on the "+" input terminal of subtraction circuit 82 and the subtraction and integration performed on the weighted prediction interval signals and the output signals from AND gate 62 results at the output terminal of integrator 83 in a negative voltage with respect to the reference voltage supplied by reference supply 84 to comparator 85. When the prediction interval signal is present and some threshold amount of vertical sync signal is present at terminal A during the prediction interval, the output signal from AND gate 62 and the weighted prediction interval signal have exactly the same areas under their time duration-amplitude product curves and the subtraction and integration in circuits 82 and 83 results in a net zero voltage with respect to the reference voltage which is supplied from reference source 84. When the prediction interval signal is present and a greater than threshold amount of vertical sync signal appears at terminal A, the output signal from AND gate 62 has a smaller time duration-amplitude product than the weighted prediction interval signal output of circuit 81 and the subtraction and integration process performed by circuits 82 and 83 results in a net positive voltage with respect to the reference level.

Comparator 85 compares the result of the subtraction and integration processes carried out during the prediction interval in circuits 82 and 83 with the reference voltage supplied from circuit 84. When the result of the subtraction and integration is negative with respect to the reference voltage, there was less than the threshold amount of vertical sync information, i.e. area under the signal curve, present at terminal A during the prediction interval.

Therefore, comparison yields approximately a zero voltage condition on an output terminal of comparator 85 which is interrogated once every vertical field at the end of the prediction interval by the action of the signal coupled from terminal C to an input terminal of gating circuit 86. During the interrogation of comparator 85, mode memory flip-flop 87 is set to a "temporary out-of-sync" condition by the signal coupled from the output terminal of AND gate 53. Since there is insufficient positive voltage on the output terminal of gating circuit 86 to reset flip-flop 87 to an in-sync condition, flip-flop 87 remains in an out-of-sync condition characterized by a positive voltage signal on its output terminal.

This signal conditions AND gate 88 to pass a signal generated at the output terminal of AND gate 73 when the next signal is detected at terminal A which has at least the width characteristic of vertical sync. The generated signal passes from the output terminal of AND gate 73 through AND gate 88 and OR gate 52, to which AND gate 88 is coupled, to reset divide-by-525 counter 51 to the new received vertical sync interval, the end of which is represented by the pulse generated at the output terminal of AND gate 73.

Counter 51 then begins to count this interval, producing the internal sync pulse between its five hundred twelfth and five hundred twenty-fifth counts at terminal C and the prediction pulse for the next expected vertical sync signal between its five hundred twentieth and five hundred twenty-fifth counts on the output terminal of AND gate 54.

If a signal is present at terminal A which has sufficient area under it during the prediction interval to produce a net positive voltage when the output signal from AND gate 62 is subtracted from the weighted prediction interval signal in subtraction circuit 82, and the result is integrated in integrator 83, the system will interpret the presence of that signal at terminal A as presence of vertical sync or an in-sync condition. In that situation, the output signal from comparator 85, when interrogated by gate 86, will be sufficient to reset mode memory flip-flop 87 which has been placed in the temporary set condition by the signal on the output terminal of AND gate 53. AND gate 88 thus will be returned to a disabled state.

From this discussion, it can be seen that the values of the weighting factor determined by weighting circuit 81 and the direct current reference voltage attributable to reference circuit 84 determine the threshold amount of vertical sync information present at terminal A to switch system 100 from the in-sync mode to the out-of-sync or search mode. The weighting factor and reference voltage can be adjusted so that the system will not search for sync until the input signal at terminal A during the prediction interval is of short duration. Such an adjustment might be desirable in areas where television signal reception is quite noisy and much of the vertical sync signal may be eradicated by noise.

Similarly, the counting interval of counter 72 could be adjusted simply by decoding a different count in AND gate 73. For example, in an area where reception is customarily noisy, it might be desirable to set counter 72 to pass a reset pulse to OR gate 71 and AND gate 88 after counter 72 has made five counts rather than the present six. This could be done in the present system by coupling output terminals of the first and third flip-flops of counter 72 to input terminals of AND gate 73 rather than output terminals of the second and third flip-flops as was previously explained.

This would make counter 72 a divide-by-five counter and would allow it to pass a resetting signal after the absence of sync had been detected at terminal A when the next signal appeared at terminal A which had a width at least five clock pulse periods or two and one-half horizontal sync pulse periods in length.

In particularly noisy areas, it might be desirable to delay searching for a signal with sufficient width to be considered vertical sync until the absence of several successive periods of vertical sync signal had been detected by the system. Such a function could be performed by the present system by simply replacing mode memory flip-flop 87 by a shift register which shifted vertical sync signal absence information at the prediction interval signal rate.

If, for example, it were desired to inhibit the sync search until the absence of four successive periods of vertical sync signal had been detected, a four bit serial shift register could monitor and store the output information from gate 86. The register could shift the information at the prediction interval signal frequency, i.e. vertical field frequency, of about 60 Hertz. The output terminals of the four serially coupled bits could be coupled to a four input AND gate and the output terminal of that AND gate could be coupled to the input terminal of AND gate 88 to which mode memory flip-flop 87 is presently coupled, or a monostable multivibrator or other waveshaping circuitry could be coupled between the two AND gates to provide the desired search enabling interval at AND gate 88.

Figure 3:
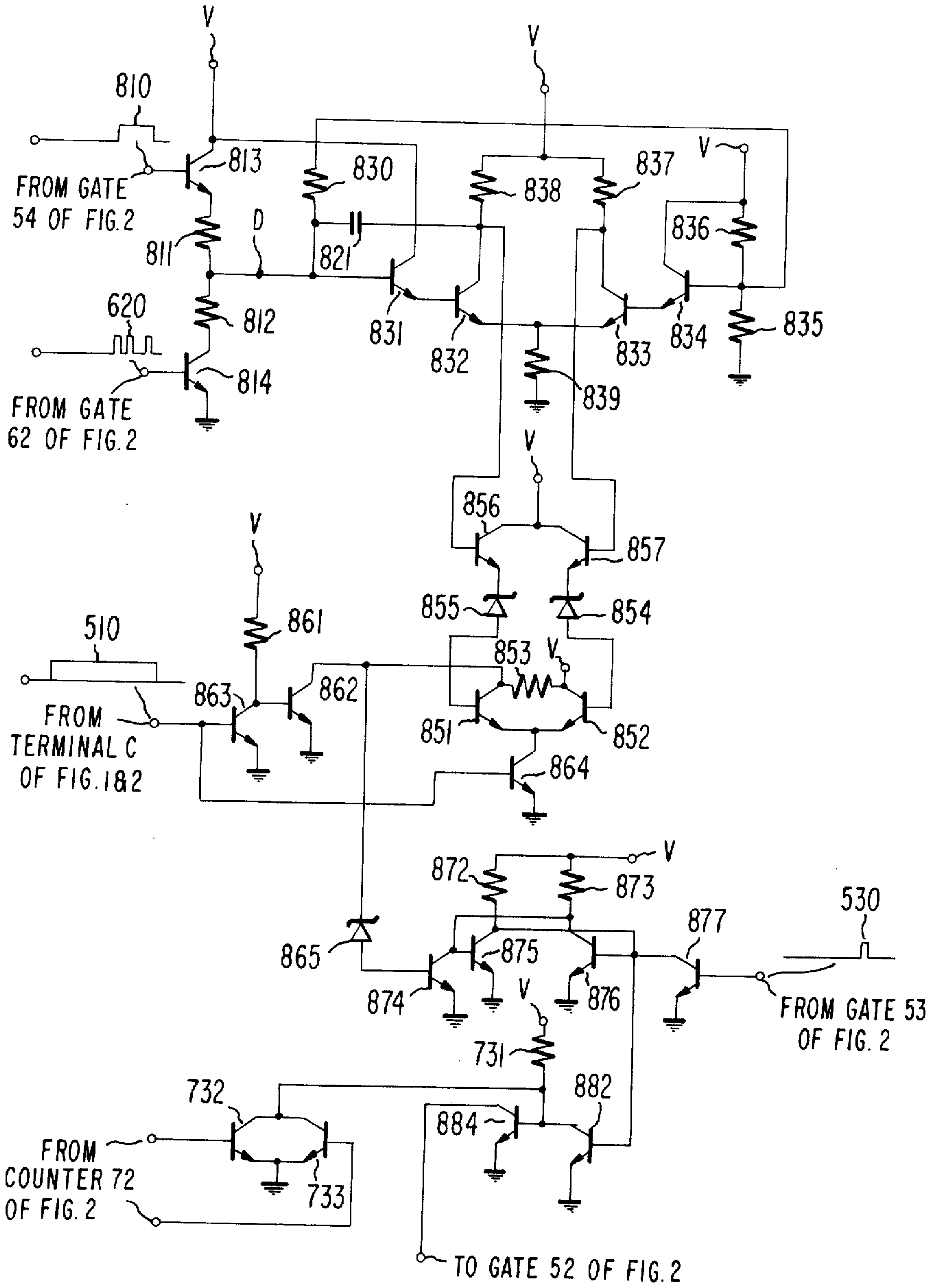
FIG. 3 is a schematic diagram of a portion of the embodiment illustrated in FIGS. 1 and 2.

FIG. 3 is a schematic diagram of a circuit which performs the function of weighting circuit 81, subtraction circuit 82, integrator 83, reference source 84, comparator 85, gating circuit 86, mode memory flip-flop 87, and AND gate 88 of FIG. 2.

Prediction interval signals 810 are coupled from gate 54 of FIG. 2 to the base electrode of a transistor 813. The collector of transistor 813 is coupled to a direct current voltage supply V and its emitter is coupled through a resistor 811 and a resistor 812 in series to the collector of a transistor 814. The emitter of transistor 814 is grounded and its base electrode is coupled to the output terminal of gate 62 of FIG. 2 and receives vertical sync absence signals 620 therefrom. It should be noted that vertical sync absence signal 620 will vary depending upon how much of the vertical sync signal coupled to terminal A of FIG. 2 is absent during prediction interval signal 810. If vertical sync is present at terminal A throughout the prediction interval, signal 620 will be at the zero level throughout the prediction interval. If there is no vertical sync at terminal A during the prediction interval, signal 620 will be high throughout the prediction interval and resemble signal 810.

The junction of resistors 811 and 812 is coupled to one terminal of a capacitor 821, to the base electrode of a transistor 831 and through a resistor 830 to the base of a transistor 834. The collector of transistor 831 is coupled to voltage supply V and its emitter is coupled to the base of a transistor 832. The collector of transistor 832 is coupled through a load resistor 838 to direct current voltage supply V. The collector of transistor 832 is also coupled to the remaining terminal of capacitor 821.

The base of transistor 834 is also coupled to supply voltage V through a resistor 836 and to ground through a resistor 835. The collector of transistor 834 is coupled to direct current voltage supply V. The emitter of transistor 834 is coupled to the base of a transistor 833, the collector of which is coupled through a load resistor 837 to direct current voltage supply V. The emitter of transistor 833 is coupled to the emitter of transistor 832. The coupled emitters of transistors 832 and 833 are coupled to ground through a resistor 339.

It can be seen that network comprising transistors 831, 832, 833, and 834 and their associated resistors is a differential amplifier which compares the voltage present at the junction of resistors 811 and 812 to a reference voltage established upon the base of transistor 834 by the voltage divider comprising resistors 835 and 836. Resistor 830, which biases the base of amplifier transistor 831 at the same operating point as transistor 834, should be substantially larger than resistors 835 and 836 to prevent coupling of signal from the base of transistor 831 to the base of transistor 834.

Transistors 813 and 814 conduct currents through resistors 811 and 812 respectively representative of the prediction interval signal 810 coupled to the base of transistor 813 and the missing vertical sync signal 620 coupled to the base of transistor 814 during the prediction interval. The ratio of the resistances of resistors 812 and 811 is the weighting factor by which the amplitude of the prediction interval signal at the base of transistor 813 is multiplied. The current through point D is the difference between these currents and results in a voltage across capacitor 821 as current through transistor 813 and resistor 811 supply a voltage at the junction of resistors 811 and 812 which is the integral of signal 810 from which is subtracted the integral of signal 620 as current flows through resistor 812 and transistor 814 to ground.

The collector of transistor 832 is also coupled to the base of a transistor 856. The collector of transistor 833 is coupled to the base of a transistor 857. The collectors of transistors 856 and 857 are joined and are coupled to direct current voltage supply V. The emitter of transistor 856 is coupled to the cathode of a zener diode 855 and the emitter of transistor 857 is coupled to the cathode of a zener diode 854. The anodes of zener diodes 855 and 854 are coupled to the bases of a transistor 851 and a transistor 852 respectively.

The collector of transistor 852 is coupled to direct current voltage supply V and the collector of transistor 851 is coupled through a load resistor 853 to direct current voltage supply V. The emitters of both transistors are coupled to the collector of a current source transistor 864, the emitter of which is grounded. The base of transistor 864 is coupled to terminal C of FIGS. 1 and 2, the output terminal of system 100. The base of a transistor 863 is also coupled to terminal C. The emitter of transistor 863 is grounded and its collector is coupled through a resistor 861 to direct current voltage supply V. The collector of transistor 863 is also coupled to the base of a transistor 862, the emitter of which is grounded. The collector of transistor 862 is coupled to the collector of transistor 851. The joined collectors of transistors 851 and 862 are coupled to the cathode of a zener diode 865.

The configuration comprising transistors 851 and 852 and load resistor 853 is a comparator circuit. Transistors 856 and 857 amplify the signals generated in the subtraction and integrating circuitry, transistors 813, 814, 831, 832, 833, and 834 and their associated components. Zener diodes 854 and 855 adjust the voltage level of the signal coupled from the emitters of transistors 857 and 856 respectively to the following comparator transistors 851 and 852. Transistors 862, 863, and 864 and zener diode 865 comprise a gating circuit which allows the comparator to become conductive and generate the comparator output voltage signal during the five hundred twelfth to five hundred twenty-fifth count interval signal 510 coupled to the bases of transistors 863 and 864 from terminal C, the output terminal of the synchronizing system 100 of FIGS. 1 and 2.

The anode of diode 865 is coupled to the base of a transistor 874. The emitter of transistor 874 is coupled to ground and its collector is coupled to the base of a transistor 875 and to the collector of a transistor 876. The emitters of transistors 875 and 876 are also coupled to ground. The collector of transistor 875 is coupled to direct current voltage supply V through a resistor 872. The collector of transistor 876 is coupled to direct current voltage supply V through a resistor 873 and the base of transistor 876 is coupled to the collectors of transistor 875 and a transistor 877. The emitter of transistor 877 is grounded and its base is coupled to the output terminal of AND gate 53 of FIG. 2.

Transistors 874, 875, 876, and 877 and their associated circuitry comprise a flip-flop which switches to the set state characterized by a low voltage on the collector of transistor 877 after a set signal 530 appears on the output terminal of AND gate 53 of FIG. 2. The flip-flop returns to the reset state only when the voltage signal on the collector of transistor 862 is high enough to result in reverse breakdown of zener diode 865 and turn on transistor 874, thereby resetting flip-flop 87. It is the reset state of this flip-flop, characterized by a high voltage on the collector of transistor 877, which corresponds to the in-sync mode of system 100 of FIG. 1.

The junction of the base of transistor 876 and the collectors of transistors 875 and 877 is coupled to the base of a transistor 882. The collector of transistor 882 is coupled through a resistor 731 to direct current voltage supply V. The emitter of transistor 882 is grounded. The base of a transistor 884 is coupled to the collector of transistor 882 as are the collectors of a transistor 732 and a transistor 733. The emitters of transistors 732, 733, and 884 are grounded. The collector of transistor 884 is coupled to an input terminal of resetting OR gate 52 of FIG. 2. The bases of transistors 732 and 733 are coupled to output terminals of counter 72.

Transistors 882 and 884 comprise AND gate 88 of FIG. 2. When sufficient positive voltage is present on the collector of transistor 877 of the preceeding flip-flop circuit, transistor 882 is driven into conduction, removing the base drive current from transistor 884. Similarly, if either transistor 732 or transistor 733 which comprise AND gate 73 of FIG. 2 are conductive, transistor 884 will not have sufficient base current to remain in conduction and it will become non-conductive, allowing its collector voltage to rise.

Prediction interval signal 810 from AND gate 54 of FIG. 2 coupled to the base of transistor 813 results in charging of capacitor 821 through weighting factor resistor 811 as signal 810 is integrated throughout the prediction interval. However, if during the prediction interval, vertical sync signal is absent at terminal A of FIG. 2, a vertical sync absence signal from AND gate 62 of FIG. 2, which may resemble waveform 620, will cause transistor 814 to conduct through weighting factor resistor 812 lowering the voltage across capacitor 821. Resistors 811 and 812, transistors 813 and 814, and capacitor 821 thereby act as a subtracter and integrator which integrates waveforms 810 and 620 and subtracts the integral of waveform 620 from the integral of waveform 810 during the prediction interval.

The differential amplifier consisting of transistors 831, 832, 833, and 834 then produces an output voltage in response to the integrated and subtracted voltage across capacitor 821 to the reference voltage established by the voltage divider comprising resistors 835 and 836 on the base of transistor 834. This comparison voltage is coupled from the collectors of transistors 832 and 833 through two amplifier tranistors 856 and 857 and signal coupling zener diodes 854 and 855 to a comparator consisting of transistors 851 and 852. If the voltage across capacitor 821 is such that the base of transistor 831 is positive with respect to the base of transistor 834, that positive voltage is an indication that during the prediction interval there was not enough vertical sync absence signal 620 coupled to the base of transistor 814 to overcome the weighting factor threshold. That is, transistor 814 will not be conductive for a sufficient length of time to discharge capacitor 821 through resistor 812 so that transistors 834 and 833 can become conductive, which conduction would indicate the absence of a predetermined threshold amount of vertical synchronizing information in the prediction interval.

The presence of this threshold amount of vertical sync information results in a determination by the circuit that enough vertical sync is present at terminal A of FIG. 2 during the prediction interval to consider the vertical sync system in-sync and not in need of a shifting or updating sync correction.

During the time interval when the comparison of the prediction interval pulses 810 and missing pulses 620 and the resultant determination of the presence or absence of vertical sync is taking place, signals 510 coupled from terminal C to the bases of transistors 863 and 864 cause those transistors to be conductive. This conduction activates the comparator comprising transistors 851 and 852. As a result of this, either transistor 852 or transistor 851 becomes conductive depending upon whether the system is in-sync or out-of-sync, respectively. At this time transistor 862 is non-conductive as a result of the conductive state of transistor 863.

At the end of this time interval, two things happen. First, a signal 530 is coupled from the output terminal of AND gate 53 of FIG. 2 to the base of transistor 877 in mode memory flip-flop 87 of FIG. 2 to turn on transistor 877. This set signal for flip-flop 87 lowers the collector voltage of transistor 877 and turns off transistor 876 and transistor 882 and turns on transistor 875. Signal 530 on the base of transistor 877 lasts only for a short time, approximately 7.9 microseconds, and between its termination and the termination of signal 510 at terminal C about 7.9 microseconds later, the comparator comprising transistors 851 and 852 continues to conduct. This conduction after the arrival of set signal 530 on the base of transistor 877 is attributable to the method chosen for resetting the divide-by-525 counter 51 of FIG. 2 in this embodiment of the invention. When the five hundred twenty-fourth pulse occurs at terminal B, all of the flip-flops of counter 51 are placed in the set condition corresponding to the number 1023, one count short of 1024, the full count of counter 51.

The five hundred twenty-fourth pulse, signal 530, is 7.9 microseconds in duration. Approximately 7.9 microseconds after the five hundred twenty-fourth positive half cycle pulse terminates, the five hundred twenty-fifth pulse begins. It is at this time, the beginning of the five hundred twenty-fifth pulse of a 525 pulse series, that the divide-by-525 counter 51 of FIG. 2 reaches full count, 1024, which corresponds to a zero on the output terminal of each flip-flop of counter 51 and thereby resets the counter to zero.

Therefore, during the interval between the passage of the five hundred twenty-fourth pulse of each 525 pulse series and the time at which the divide-by-525 counter is reset to zero, the comparator comprising transistors 851 and 852 remains enabled. If, after temporary out-of-sync signal 530 sets the mode memory flip-flop 87 of FIG. 2 by turning on transistor 877, transistor 852 remains in conduction corresponding to an in-sync condition, current flowing from direct current voltage supply V through resistor 853 will cause zener diode 865 to break down, resulting in resetting of the mode memory flip-flop 87 of FIG. 2 as transistor 874 is turned on by the breakdown, and turns on transistors 876 and 882.

If, after temporary out-of-sync pulse 530 turns on transistor 877, transistor 851 remains on corresponding to an out-of-sync condition, the voltage at the junction of resistor 853 and transistor 851 will be low. As a result, there will be no reverse breakdown of zener diode 865 and transistor 874 will remain off. Mode memory flip-flop 87 of FIG. 2 will remain in the set (out-of-sync) condition as transistor 875 will remain on after temporary out-of-sync pulse 530 passes. Therefore, transistor 882 will remain off.

The off state of transistor 882 corresponds to the out-of-sync or "search" mode of sync system 100. Transistors 732 and 733 are coupled to flip-flops in counter 72 in such a manner that until counter 72 has passed six counts from terminal B of FIGS. 1 and 2 without resetting, either one or the other or both of transistors 732 and 733 will be on. When counter 72 has counted six counts of twice horizontal clock frequency signal 37 coupled from terminal B without resetting, transistors 732 and 733 will both be turned off for a brief time interval. If transistor 882 is also off, corresponding to an out-of-sync condition in system 100, then transistor 884 will be turned on by virtue of the voltage at the junction of resistor 731 and the base of transistor 884. This pulls down a voltage at the collector of transistor 884 supplied from OR gate 52 of FIG. 1 and causes a resetting pulse to be passed to the reset line of divide-by-525 counter 51 of FIG. 2 through OR gate 52 updating the synchronization of divide-by-525 counter 51.

It may be seen from this discussion that the system shown in FIG. 3 performs all of the logic functions necessary to verify whether there is sufficient information in the received signal coupled to terminal A of FIGS. 1 and 2 to consider that information authentic vertical sync.

The received signal at terminal A is used to generate a vertical sync absence signal on the output terminal of AND gate 62 of FIG. 2 which is coupled to the system of FIG. 3 through the base of transistor 814. That vertical sync absence signal is compared to a prediction interval signal generated internally by counter 51 of FIG. 2 and its associated components. During the comparison, the prediction interval signal is weighted by the ratio of the values of resistors 812 and 811. This weighting factor allows adjustment of the sensitivity of the system to missing sync. A lower weighting factor makes the system more sensitive to a detection of missing sync and a higher weighting factor makes the system less sensitive to missing sync.

The effect of the weighting factor is to adjust the amplitude of the charging current coupled from the emitter of transistor 813 through resistor 811 to capacitor 821 to result in a higher or lower voltage than that resulting from the discharging current coupled from the collector of transistor 814 through resistor 812 to capacitor 821. For example, values of resistors 812 and 811 of 16,000 ohms and 20,000 ohms respectively yield a weighting factor of 4/5 (i.e. 16/20) which means that when both transistors 813 and 814 are driven into conduction for the same time interval, capacitor 821 will charge at only 4/5 the rate at which it is discharging, yielding a net negative voltage at the base of transistor 831 with respect to the base voltage of transistor 834.

An in-sync determination by the subtracting and integrating circuitry, transistors 813, 814, 831, 832, 833, and 834 and their associated components, results in transistors 831 and 832 being on. As a rsult, during the interval in which the in-sync decision is to be interrogated out of the decision circuitry by the comparator transistors 851 and 852, transistors 856 and 851 and zener diode 855 are non-conductive.

Since during the interrogating interval terminal C of FIG. 2 has a positive voltage with respect to ground, waveform 510, impressed upon it, transistors 863 and

864 are conductive and transistor 862 is non-conductive. When transistor 851 is also non-conductive, a positive voltage results on its collector which causes breakdown of zener diode 865 and resetting of the mode memory flip-flop which has been set by signal 530 coupled from gate 53 of FIG. 2 to the base of transistor 877 as previously explained. The resetting of the mode memory flip-flop causes the collector of transistor 877 to return to a positive voltage and results in turning on transistor 882, turning off transistor 884 and raising the collector voltage of transistor 884 to inhibit resetting through AND gate 88 of FIG. 2 comprising transistors 882 and 884.

An out-of-sync determination by the subtracting and integrating circuitry results in transistors 834 and 833 being conductive. As a result of this out-of-sync determination, transistors 856 and 851 and diode 855 are conducting. Therefore during the interrogating interval, the collector of transistor 851 is sufficiently low so that no reverse breakdown of diode 865 occurs. Thus, after set signal 530 is coupled to the base of transistor 877 there is no subsequent reset signal and mode memory flip-flop 87 of FIG. 2 remains in an out-of-sync or search mode. The collector of transistors 877 (and hence the base of transistor 882) remains low and transistor 882 is off.

The arrival of the next signal at terminal A of FIG. 2 which has sufficient time duration to keep counter 72 from being reset for a long enough time to cause both transistors 732 and 733 to be turned off causes transistor 884 to be rendered conductive and pass a sync updating reset signal to OR gate 52 of FIG. 2.

What is claimed is:

1. A synchronizing system comprising:

a source of external synchronizing signals;

resettable counting means adapted for counting signals from a source of second signals integrally related in frequency to said external signals for generating internal signals at said external synchronizing signal frequency, said resettable counting means capable of being reset by said internal signals;

external synchronizing signal verification means coupled to said source of external synchronizing signals and to said resettable counting means for verifying the presence and absence of said external synchronizing signals during said internal signals and for generating first and second signal levels respectively in response thereto;

external synchronizing signal detecting means coupled to said source of external synchronizing signals for detecting when signals from said source have at least a predetermined time duration and for generating signals when said time duration is greater than the minimum time duration of said external synchronization signals; and mode switching means coupled to said resettable counting means, to said external synchronizing signal detecting means and to said external synchronizing signal verification means for switching to a non-synchronous mode of operation in response to said second signal level generated by said external synchronizing signal verification means for passing a signal from said external synchronizing signal detecting means upon the occurrence of a subsequent signal from said source of external synchronizing signals for resetting said resettable counting means for synchronizing said internal signals such that succeeding internal signals are substantially in synchronism with said subsequent signal from said source of external synchronizing signals.

2. A synchronizing system according to claim 1 wherein:

said mode switching means switches from said synchronous mode of operation to said non-synchronous mode of operation immediately upon detecting that said internal signals are not substantially in synchronism with said external synchronizing signals thereby passing said signal generated by said external synchronizing signal detecting means for resetting said resettable counting means and shifting the synchronization of said internal signals such that succeeding internal signals are substantially in synchronism with said next succeeding signal from said source of external synchronizing signals.

3. A synchronizing system according to claim 1 wherein:

said mode switching means switches from said synchronous mode of operation to said non-synchronous mode of operation upon detecting that said internal signals have not been substantially in synchronism with said external synchronizing signals for a predetermined number of cycles of said internal signals, thereby passing said signal from said external synchronizing signal detecting means for resetting said resettable counting means and shifting the synchronization of said internal signals such that internal signals after said predetermined number of cycles are substantially in synchronism with said next succeeding signal after said predetermined number of cycles from said source of external synchronizing signals.

4. A synchronizing system comprising:

a source of external synchronizing signals;

resettable counting means adapted for counting signals from a source of second signals integrally related in frequency to said external signals for generating internal signals at said external synchronizing signal frequency, said resettable counting means capable of being reset by said internal signals;

external synchronizing signal verification means comprising:

a first coincidence gate, one input terminal of which is coupled through inverting means to said source of external synchronizing signals and another input terminal of which is coupled to said resettable counting means for receiving said internal signals therefrom for generating an absence signal when said external synchronizing signal is absent during said internal signal;

weighting means coupled to said resettable counting means for adjusting the amplitude of said internal signal;

subtracting and integrating means coupled to said first coincidence gate and to said weighting means for integrating said weighted internal signals and said external synchronizing signal absence signals and subtracting said integrated absence signals from said integrated weighted internal signals, the difference of said integrated signals forming first and second signal levels respectively representative of the presence or absence of said external synchronizing signals;

external synchronizing signal detecting means coupled to said source of external synchronizing signals for detecting when signals from said source have at least a predetermined time duration and for generating signals in response to said detection; and mode switching means coupled to said resettable counting means, to said external synchronizing signal detecting means and to said external synchronizing signal verification means for switching to a non-synchronous mode of operation in response to said second signal level generated by said external synchronizing signal verification means for passing a signal from said external synchronizing signal detecting means upon the occurrence of a subsequent signal from said source of external synchronizing signals for resetting said resettable counting means for synchronizing said internal signals such that succeeding internal signals are substantially in synchronism with said subsequent signal from said source of external synchronizing signals.

5. A synchronizing system according to claim 4 wherein said external synchronizing signal verification means further comprises comparing means coupled to said subtracting and integrating means for comparing the result of said subtraction and integration to a threshold reference voltage for determining whether said external synchronizing signal information occurring during said internal signal is sufficient so that said internal signal may be considered to be substantially in synchronism with said external synchronizing signal and for generating said first signal level in response thereto.

6. A synchronizing system according to claim 4 wherein said external synchronizing signal verification means further comprises a second coincidence gate, one input terminal of which is coupled to said source of external synchronizing signals and another input terminal of which is coupled to an output terminal of a delay line, the input terminal of which is coupled to said source of external synchronizing signals, and an output terminal of said second coincidence gate is coupled through said inverting means to said input terminal of said first coincidence gate for removing pulses of shorter duration than the delay time of said delay line from said external synchronizing signal information coupled through said inverting means to said input terminal of said first coincidence gate.

* * * * *